(12) United States Patent
Ukon

(10) Patent No.: US 6,418,217 B1
(45) Date of Patent: *Jul. 9, 2002

(54) ARRIVED CALL RECEIVING SYSTEM FOR SUPPORTING RECEPTION SERVICES USING TELEPHONE AND RECEIVING METHOD THEREFOR

(75) Inventor: Shinichi Ukon, Tokyo (JP)

(73) Assignee: NEC Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,011

(22) Filed: Aug. 11, 1997

(30) Foreign Application Priority Data

Aug. 14, 1996 (JP) ............................... 8-213952

(51) Int. Cl.$^7$ ..................... H04M 1/64; H04M 3/42; H04M 3/00
(52) U.S. Cl. ................... 379/210.01; 379/88.19; 379/207.05; 379/209.01; 379/265.01; 379/265.09
(58) Field of Search .............................. 379/67.1, 88.01, 379/88.2, 112, 113, 221, 265, 266, 273, 209, 260, 261, 262, 263, 265.01, 265.09, 265.11, 266.01, 88.19, 88.21, 88.23, 207.05, 207.08, 207.15, 209.01, 210.01, 214.01; 709/202, 204, 226, 227

(56) References Cited

U.S. PATENT DOCUMENTS

| | | | | |
|---|---|---|---|---|
| 4,328,396 A | * | 5/1982 | Theis | 179/6.04 |
| 4,788,715 A | * | 11/1988 | Lee | 379/84 |
| 4,800,583 A | * | 1/1989 | Theis | 379/67 |
| 5,020,095 A | * | 5/1991 | Morganstein etal. | 379/88.23 |
| 5,166,974 A | * | 11/1992 | Morganstein et al. | 379/67 |
| 5,283,818 A | * | 2/1994 | Klausner et al. | 379/67 |
| 5,309,505 A | * | 5/1994 | Szlam et al. | 379/88 |
| 5,311,574 A | * | 5/1994 | Livanos | 379/88.2 |
| 5,311,583 A | * | 5/1994 | Friedes et al. | 379/209 |
| 5,511,112 A | * | 4/1996 | Szlam | 379/266.06 |
| 5,530,744 A | * | 6/1996 | Charalambous et al. | 379/265 |
| 5,625,682 A | * | 4/1997 | Gray et al. | 379/266 |
| 5,627,884 A | * | 5/1997 | Williams et al. | 379/88 |
| 5,692,033 A | * | 11/1997 | Farris | 379/67.1 |
| 5,757,904 A | * | 5/1998 | Anderson | 379/265 |
| 5,884,032 A | * | 3/1999 | Bateman et al. | 395/200.34 |

FOREIGN PATENT DOCUMENTS

JP 496463 3/1992

* cited by examiner

*Primary Examiner*—Allan Hoosain
(74) *Attorney, Agent, or Firm*—Hayes Soloway P.C.

(57) ABSTRACT

An arrived call receiving system including a caller's number automatic recognition unit for extracting and recognizing a phone number included in an arrived call, an automatic answering unit for confirming by the caller whether the recognized phone number is correct and recognizing a reply from the caller, as well as conducting necessary processing according to the contents of the recognized reply, a caller's information storage unit and a caller's information data base for storing the phone number of the caller obtained by the caller's number automatic recognition unit, and a caller automatic call-up unit for reading the phone number of the caller stored in the caller's information data base to automatically call up the caller according to instructions of an operator.

11 Claims, 4 Drawing Sheets

FIG. 4

| EXAMPLE OF VOICE FROM AUTOMATIC ANSWERING UNIT | REACTION EXAMPLE OF APPLICANT (CALLER) |
|---|---|
| "THIS IS TELEPHONE RECEPTION CENTER. YOU CAN BE REACHED AT THE NUMBER "123-4567"? PLEASE ENTER "1" WHEN THE NUMBER IS RIGHT AND ENTER "0" WHEN THE NUMBER IS TO BE CORRECTED." | |
| | 1 (PB INPUT) OR "ONE" (VOICE INPUT) |
| "YOUR APPLICATION HAS BEEN RECEIVED. PLEASE HANG UP TO WAIT FOR A MOMENT. WE WILL CALL YOU BACK LATER." | |

ARRIVED CALL RECEIVING SYSTEM FOR SUPPORTING RECEPTION SERVICES USING TELEPHONE AND RECEIVING METHOD THEREFOR

BACKGROUND OF THE INVENTION

1. Field of the Invention

The present invention relates to an arrived call receiving system, in various kinds of reception services using the telephone, for automatically answering an arrived call from an applicant to obtain necessary information and automatically calling up an applicant as required, and a receiving method therefor.

2. Description of the Related Art

In various reception services using the telephone, when the number of arrived call from applicants exceeds the receivable number (the number of prepared lines), there occurs a case in which the receptionist side rings back overflowing applicants. Means for reducing time and labor required for the services of this kind is disclosed, for example, in Japanese Patent Laying-Open (Kokai) No. Heisei 4-96463, entitled "Reception Service Processing Device". The literature recites a device which automatically answers an arrived call to demand a call-up dial of an applicant for use in calling him back.

The device recited in the above literature includes an automatic answering unit capable of automatically answering an arrived call from an applicant to send a message informing that the call is unreceivable and that the applicant will be called back and a message demanding a phone number of the applicant, an applicant's phone number recognizing unit for receiving and recognizing a phone number notification sent from an applicant, an overflowing call state indicating unit for storing a phone number of an applicant and indicating the same together with application order information, and an applicant automatic call-back unit for automatically making a call by using a phone number stored at the overflowing call state indicating unit to call up an applicant in question. When receiving arrived calls numbering more than the receivable number, this structure enables the device to automatically answer an overflowing call to store a phone number of an applicant and call up the applicant when the device enters a call receivable state.

The above-described conventional arrived call receiving technique, however, obtains a phone number of an applicant through notification made by the applicant himself using a tone signal or in voice according to instructions from said automatic answering unit. This method takes much time to deal with overflowing calls to decrease an idle line occurrence probability, resulting in reduction in the total number of received calls.

Reception services using the above-described arrived call receiving technique are in principle performed in the following procedure. Upon arrival of a call from an applicant, all the application reception services are done and only when an application overflows, a phone number of an applicant is obtained to call back the applicant from the receptionist side. Operators therefore need to do both a reception service at the time of arrival of a call from an applicant, and a reception service at the time of call-back from the receptionist side when a call overflows. This procedure makes the services complicated.

Furthermore, since the application reception service is in principle performed at the arrival of a calls from an applicant, time is lost for the service, thereby decreasing an idle line occurrence probability, and reducing the total number of received calls.

SUMMARY OF THE INVENTION

An object of the present invention is to provide an arrived call receiving system enabling reduction in time required for services to be performed at the time of arrival of a call from an applicant to increase an idle line occurrence probability, thereby increasing the total number of received calls, as well as reducing a loss of occasions to receive calls, and a receiving method therefor.

Another object of the present invention is to provide an arrived call receiving system enabling reduction of a work load to improve service efficiency by completely antomating answering an arrived call from an applicant and centralizing operators, services in a reception service performed by making a call by the receptionist side.

According to the first aspect of the invention, an arrived call receiving system for automatically answering a call arrived at a telephone and obtaining necessary information to support reception services using the telephone, comprises caller's number recognizing means, when a call arrives at the telephone, for extracting and recognizing a phone number of a caller of the arrived call included in the arrived call, automatic answering means for confirming by the caller whether the phone number recognized by the caller's number recognizing means is right or not and recognizing a reply to the confirmation from the caller, as well as conducting necessary processing according to the contents of the recognized reply, storage means for storing the phone number of the caller obtained by the caller's number recognizing means according to a result of the processing by the automatic answering means to make up a data base, and caller automatic call-up means responsive to operator's instructions for reading the phone number of the caller stored in the storage means to call up the caller.

The automatic answering means operates as follows:

when a reply from the caller indicates that a phone number recognized by the caller's number recognizing means is correct, sends the phone number recognized by the caller's number recognizing means to the storage means, and when the replay from the caller indicates that the phone number recognized by the caller's number recognizing means is incorrect, demands input of the corrected phone number of the caller and upon recognizing the received phone number, again confirms by the caller whether the recognition result is correct.

The automatic answering means may further comprise automatic voice answering means for sending a message predetermined according to situations to give voice guidance to the caller, tone recognizing means, when various inputs including the reply from the caller are made by a tone signal, for recognizing the contents of the input, and voice recognizing means, when various inputs including the reply from the caller are made in voice, for recognizing the contents of the input, wherein automatic answering means operates as follows:

when receiving the phone number of the caller from the caller's number recognizing means, sends a message to the caller for confirming whether the phone number is correct or incorrect, when a recognition result obtained by the tone recognizing means or the voice recognizing means, a reply from the caller indicates that the phone number recognized by the caller' number recognizing means is correct, sends a message demanding that the caller should hang up once to wait for a receptionist to call back to perform reception services, and when in a recognition result obtained by the tone recognizing means or the voice recognizing means, the replay from the caller indicates that the phone number recognized by the caller's number recognizing means is incorrect, sends a message to the caller demanding input of the correct phone number.

In the preferred construction, the arrived call receiving system may further comprise line connecting means for connecting a line between the caller and an operator when the caller answers a call made by the caller automatic call-up means.

According to the second aspect of the invention, an arrived call receiving method of an arrived call receiving system which automatically answers a call arrived at a telephone and obtains necessary information to support reception services using the telephone, comprising the steps of:

when a call arrives at the telephone, extracting and recognizing a phone number of a caller of the arrived call included in the arrived call;

confirming by the caller whether the phone number recognized by the caller's number recognizing step is correct and recognizing a reply to the confirmation from the caller, as well as conducting necessary processing according to the contents of the recognized reply;

storing the phone number of the caller obtained by the caller's number recognizing step according to a result of the processing by the automatic answering step to make up a data base; and reading the phone number of the caller stored in the data base according to operator's instructions to call up the caller.

The automatic answering step may further comprise the steps of:

when a reply from the caller indicates that a phone number recognized by the caller's number recognizing step is correct, sending the phone number recognized by the caller's number recognizing step for storing, and when the replay from the caller indicates that the phone number recognized by the caller's number recognizing step is incorrect, demanding input of a right phone number of the caller and upon recognizing the received phone number, again confirming by the caller whether the recognition result is correct.

The automatic answering step may comprise the steps of:

when the phone number of the caller is received from the caller's number recognizing step, sending a voice message to the caller for confirming whether the phone number is correct or incorrect, when a reply from the caller indicates that the phone number recognized by the caller's number recognizing step is correct, sending a voice message demanding that the caller should hang up once to wait for a receptionist to call back to perform reception services, as well as sending the phone number recognized by the caller's number recognizing step for storing, and when the reply from the caller indicates that the phone number recognized by the caller's number recognizing step is incorrect, sending a voice message demanding input of a right number of the caller and after recognizing the received phone number, again confirming by the caller whether the recognition result is correct or incorrect.

In the preferred construction, the arrived call receiving method may further comprise step of connecting a line between the caller and an operator when the caller answers a call made at the caller automatic call-up step.

According to the third aspect of the invention, a computer readable memory which stores a control program for controlling an arrived call receiving system which automatically answers a call arrived at a telephone and obtains necessary information to support reception services using the telephone, the control program comprising the steps of:

when a call arrives at the telephone, extracting and recognizing a phone number of a caller of the arrived call included in the arrived call;

confirming by the caller whether the phone number recognized by the caller's number recognizing step is correct and recognizing a reply to the confirmation from the caller, as well as conducting necessary processing according to the contents of the recognized reply;

storing the telephone number of the caller obtained by the caller's number recognizing step according to a result of the processing by the automatic answering step to make up a data base; and reading the phone number of the caller stored in the data base according to operator's instructions to call up the caller.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is an explanatory diagram showing a concrete example of output of voice guidance and a concrete example of input by a caller.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
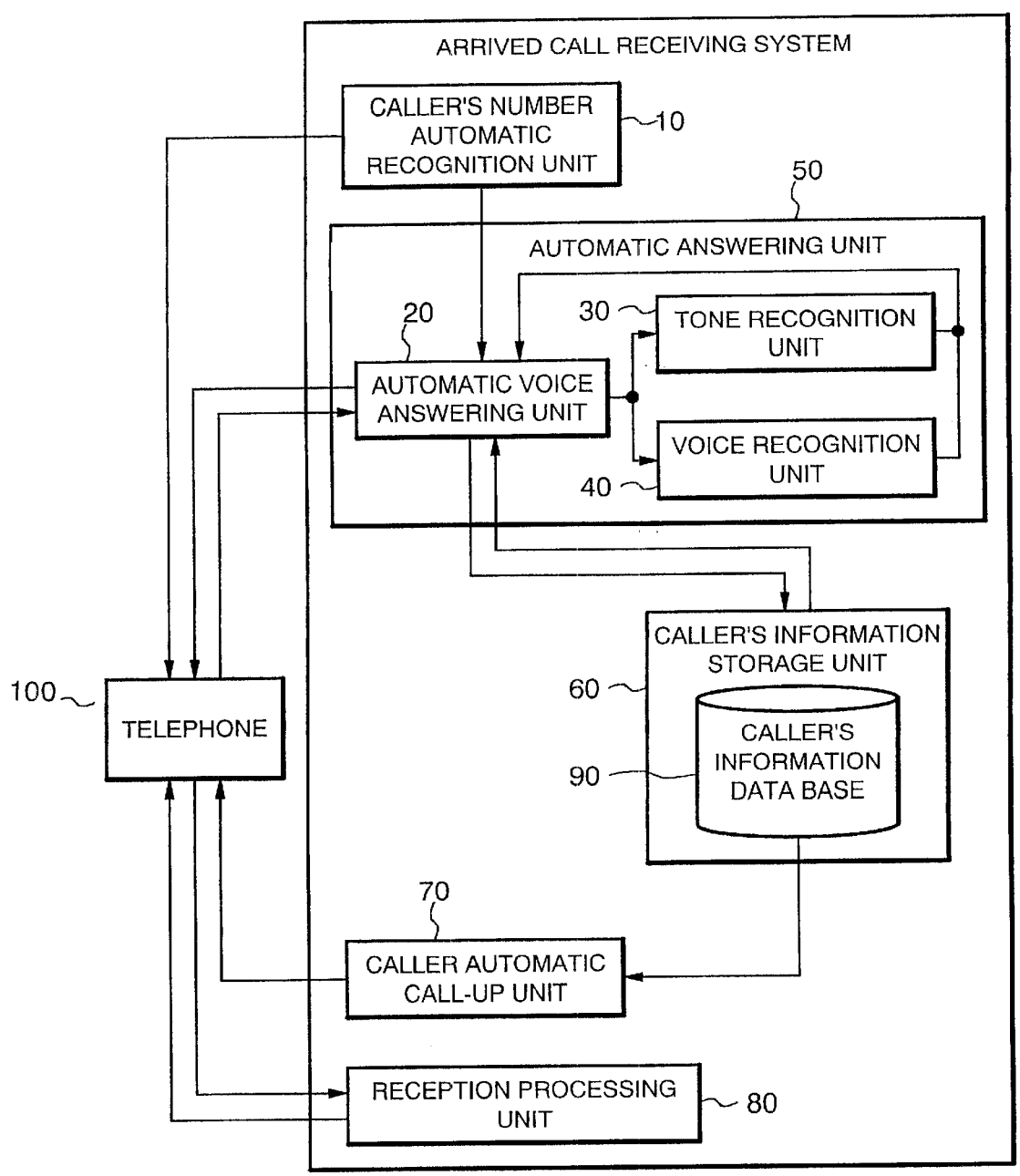
FIG. 1 is a block diagram showing structure of an arrived call receiving system according to one embodiment of the present invention.

FIG. 1 is a block diagram showing structure of an arrived call receiving system according to one embodiment of the present invention.

With reference to FIG. 1, an arrived call receiving system of the present embodiment connects with a telephone 100 and includes a caller's number automatic recognition unit 10 for recognizing a phone number of a caller (applicant) (hereinafter referred to as a caller's number) an automatic answering unit 50 for automatically answering an arrived call, a caller's information storage unit 60 and a caller's information data base 90 for storing information regarding a caller obtained by answering of the automatic answering unit 50, a caller automatic call-up unit 70 for calling up a caller with reference to information stored in the caller's information data base 90, and a reception processing unit 80 for transferring processing to an operator who performs reception services. The automatic answering unit 50 includes an automatic voice answering unit 20 for answering a caller in voice over the telephone, and a tone recognition unit 30 and a voice recognition unit 40 for recognizing a caller's number notification sent from a caller by a tone signal or a voice signal as required. characteristic part of the structure of the present embodiment but not of the remaining common part.

In the above-described structure, the caller's number automatic recognition unit 10, the automatic voice answering unit 20, the tone recognition unit 30, the voice recognition unit 40, the caller's information storage unit 60, the caller automatic call-up unit 70 and the reception processing unit 80 are implemented by computer-program-controlled CPU and internal memory such as a RAM. The caller's information data base 90 is implemented by an external storage device such as a medium such as a magnetic disk or a semiconductor memory. Loading the program into an internal memory to control the CPU realizes the above-described respective function executing units.

The present embodiment will be described on the premise that a call sent from a caller to a receiver through a telephone line includes a caller's number as information. This enables the receiver side to recognize a caller's number from an arrived call.

Upon reception of an arrived call from a caller over the telephone 100, the caller's number automatic recognition unit 10 recognizes a caller's number and sends the recognition results to the automatic answering unit 50.

The automatic voice answering unit 20 gives voice guidance to the caller. In the voice guidance, a message registered in advance is transmitted as required to demand that the caller should follow a predetermined procedure. For example messages registered in the voice guidance may include a message for confirming whether a recognized caller's number is correct or not, a message for demanding input of the correct caller's number when the recognized caller's number is incorrect, and a message for informing that the receptionist side will call back a caller at a later time and asking the caller to hang up to wait. The message for confirming a caller's number is provided with a blank into which numbers of approximately 15-digits, for example, can be inserted. A caller's number sent from the caller's number automatic recognition unit 10 is inserted into the blank at the time of transmission of the message.

The tone recognition unit 30 recognizes a notification made by a tone signal sent from a caller. Notifications to be sent from a caller include a reply notification indicating whether a caller's number recognized by the caller's number automatic recognition unit 10 is correct or incorrect and caller's number notification informing a correct caller's number when a caller's number recognized by the caller's number automatic recognition unit 10 is incorrect.

The voice recognition unit 40 recognizes a voice notification sent from a caller. Notifications to be sent from a caller are, as well as the notifications recognized by the tone recognition unit 30, reply notification and caller's number notification.

The automatic answering unit 50 controls the above-described automatic voice answering unit 20, tone recognition unit 30 and voice recognition unit 40 to obtain a caller's number from an arrived call and send same to the caller's information storage unit 60.

The caller's information storage unit 60 receives a caller's number obtained by the operation of the automatic answering unit 50 and stores the same in the caller's information data base 90.

The caller automatic call-up unit 70 reads a desired caller's number from the caller's information data base 90 through commands generated by the operator, and dials the caller's number in question.

The reception processing unit 80 transfers a call arrived from the automatic call-up unit 70 to the operator to enable the operator to start reception services.

Figure 2:
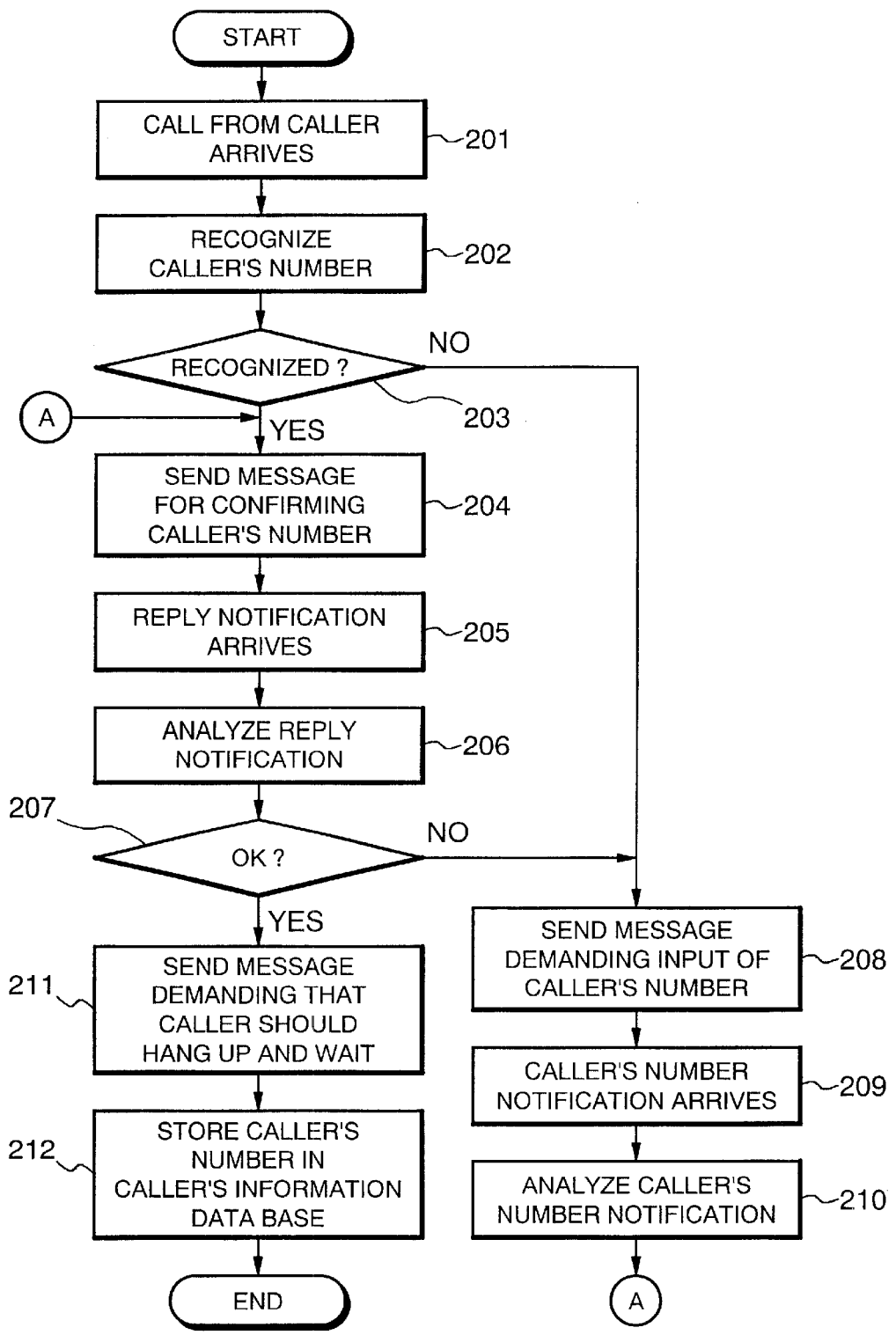
FIG. 2 is a flow chart showing operation of arrived call answering processing according to the present embodiment.
Figure 3:
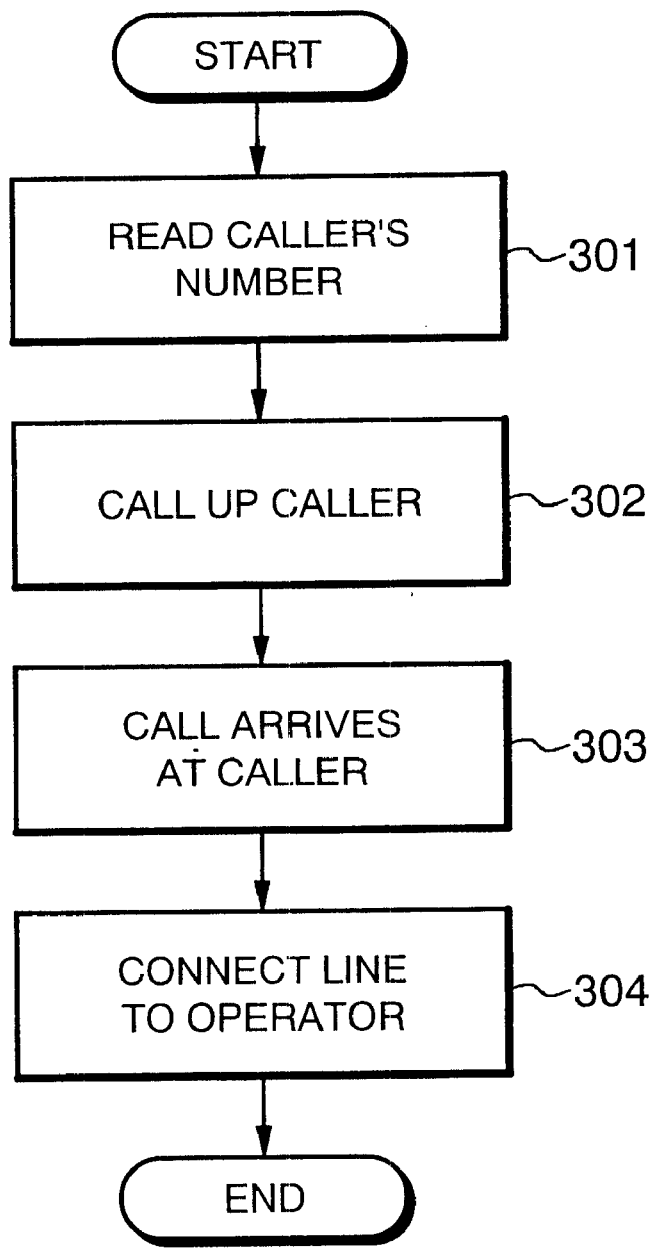
FIG. 3 is a flow chart showing caller calling up operation according to the present embodiment.

Operation of the present embodiment will be detailed with reference to flow charts of FIGS. 2 and 3. FIG. 2 is a flow chart showing arrived call reception processing to be conducted at the reception of a call from a caller, while FIG. 3 is a flow chart showing processing using an obtained caller's number to call up the corresponding caller.

As an entire flow of operation of the present embodiment, all the arrived calls from callers are automatically answered to obtain callers' numbers, stored in the data base, and then all the callers are sequentially and automatically called up to perform reception services. This is different from conventional operations in which two lines of operation exist one for answering an arrived call from an applicant the other for obtaining an applicant's phone number and calling back the applicant from the receptionist side.

First, description will be made of arrived call reception processing with reference to FIG. 2.

When a call from a caller arrives at the telephone 100 (Step 201), the arrived call is sent to the caller's number automatic recognition unit 10 to recognize a caller's number (Step 202).

When the caller's number is recognized at the caller's number automatic recognition unit 10, the arrived call in question is sent to the automatic answering unit 50 (Step 203). Then, voice guidance is given by the automatic voice answering unit 20 to send a message to the caller for confirming whether the recognized caller's number is that of the caller in question (Step 204). In other words, at the time when the call arrives, the caller is informed that the caller's number is already recognized by the receptionist side and is requested to input a reply notification for confirmation by a tone signal applied through a push-button, or voice response.

Upon arrival of the reply notification from the caller made by a tone signal or voice response (Step 205), the reply notification is sent to the tone recognition unit 30 and the voice recognition unit 40 for analyses (Step 206). More specifically, reply notification made by a tone signal is analyzed by the tone recognition unit 30, while replay notification made by a voice response is analyzed by the voice recognition unit 40.

When the caller's number can not be recognized at the caller's number automatic recognition unit 10 (Step 203), or when the replay notification from the caller recognized at the tone recognition unit 30 and the voice recognition unit 40 indicates that the caller's number is incorrect (Step 207), the automatic voice answering unit 20 gives voice guidance to the caller to send a message requesting input number in (Step 208).

Upon arrival of the caller's number notification from the caller (Step 209), the notification is sent to the tone recognition unit 30 and the voice recognition unit 40 for analyses (Step 210). More specifically, when the caller's number notification is made by a tone signal, it is analyzed by the tone recognition unit 30, while when the notification is made by voice response, it is analyzed by the voice recognition unit 40. Then again, the message confirming whether the recognized caller's number is that of the caller in question is sent to the caller to enter a caller's reply notification waiting state (Step 204).

At Step 207, when the reply notification from the caller recognized at the tone recognition unit 30 or the voice recognition unit 40 indicates that the caller's number is correct (Step 207), the automatic voice answering unit 20 gives voice guidance by sending a message informing the caller that the receptionist side will call back the caller and requesting that the caller should hang up to wait (Step 211). Then, the caller's number obtained by the caller's information storage unit 60 is stored in the caller's information data base 90 (Step 212).

Next, processing for calling up a caller will be described with reference to FIG. 3.

The operator gives the caller automatic call-up unit 70 instructions on predetermined conditions to start automatic calling and begin reception services. Reception service starting conditions may be, for example, the number of callers, numbers stored in the caller's information data base 90 exceeding a fixed value, or fixed elapsed time from a first arrival of a call.

When the operator gives instructions to start automatic calling, the caller automatic call-up unit 70 first reads a caller's number of a caller to be called up from the caller's information data base 90 (Step 301). Then, automatic call-up of the caller is conducted according to the caller's number (Step 302). Upon arrival of the call to the caller in question (Step 303), the reception processing unit 80 sends a message informing that the call is from the receptionist and then the line is connected to the operator (Step 304). Thereafter, the operator performs reception services for the caller in question.

Next, operation of the present embodiment will be described with reference to an example of conversation to be made between a caller and a receptionist in the reception services shown in FIG. 4.

When a call from a caller arrives at the telephone 100 of a receptionist, first, the caller's number automatic recognition unit 10 recognizes a caller's number included in the arrived call (FIG. 2, Steps 201 and 202). When the caller's number notification is normally recognized, the arrived call is sent to the automatic voice answering unit 20 (Step 203).

The automatic voice answering unit 20 gives voice guidance, inserts the caller's number recognized at the caller's number automatic recognition unit 10 into the message confirming whether the recognized caller's number is that of the caller in question and sends out the message. For example, as shown in FIG. 4, a message is sent that "This is the telephone reception center. You can be reached at the number "123-4567"? Please enter "1" when the number is right and enter "0" when the number is to be corrected". In this message, the part "123-4567" denotes the inserted caller's number.

Operation up to this stage is automatically conducted after the arrival of a call. The caller therefore will receive a message already containing the caller's number at the first voice guidance after the arrival of the call.

When the caller's number in the message is correct, the caller makes reply notification for confirmation. To the above-described message, the caller will press the push-button "1" to send a tone signal or voice "One" to send a voice signal as shown in FIG. 4. The replay notification sent to the receptionist side is simultaneously sent to the PB tone recognition unit 30 and the voice recognition unit 40 and recognition results are sent to the automatic voice answering unit 20.

Then, when either the recognition results obtained by the PB tone recognition unit 30 or the voice recognition unit 40 indicate that the caller's number is correct, the automatic voice answering unit 20 gives voice guidance in response to the recognition results to send the message informing that the receptionist will call back the caller and requesting that the caller should hang up to wait. For example, as shown in FIG. 4, a message is sent that "Your application has been received. Please hang up and wait for a moment. We will call you back later." In addition, the caller's information storage unit 60 stores the recognized number in the sender's information data base 90.

On the other hand, when both of the recognition results obtained by the PB tone recognition unit 30 and the voice recognition unit 40 indicate that the caller's number is incorrect, that is, when the contents of the reply notification made by a tone signal or in voice are "0", the routine proceeds to the operation for requesting input of the correct caller's number. Then, after the caller's number is input by the caller, the above-described confirmation operation will be repeated.

After thus obtaining the caller's number, when the operator gives instructions to start automatic calling, the caller automatic call-up unit 70 reads the caller's number stored in the caller's information data base 90, to conduct automatic call-up. Then, at the time when the call is connected to the caller, the reception processing unit 80 connects the line to the operator.

As described in the foregoing, by automatically obtaining a caller's number from an arrived call, the arrived call receiving system and the arrived call receiving method of the present invention are allowed to limit the processing with respect to an arrived call (applicant) to the processing of specifying a caller and confirming the caller's number, as well as automatizing these processing. It is therefore possible to minimize time required for connecting to an arrived call from one caller, whereby an idle line the probability of is increased, and the total number of received calls is also expected to increase as a result.

Another effect is that an increase in the total number of received calls leads to reduction in loss of occasions to receive calls such as an order from an applicant.

Furthermore, unlike the conventional systems and methods which follow a procedure of performing all the application reception services at the time of arrival of a call from an applicant and only when the call overflows, obtaining a phone number of the applicant to call back the applicant from the receptionist side, the arrived call receiving system and the arrived call receiving method of the present invention enable answering an arrived call from an applicant to be completely automatized and services performed by operators to be centralized in only the reception service done by making a call by the receptionist side. As a result, a work load can be reduced to improve service efficiency.

In addition, since no reception service is performed at the time of arrival of a call from an applicant, it is possible to reduce time required for the services done at this time, whereby an idle line occurrence probability can be increased and the total number of received calls is expected to increase accordingly.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which fall within a scope set out in the appended claims.

What is claimed is:

1. An arrived call receiving system for automatically answering a call and obtaining necessary information to support reception services using the telephone, comprising:
   caller's number recognizing means for extracting and recognizing a phone number of a caller included in the arrived call;
   automatic answering means for confirming by said caller whether the phone number recognized by the said caller's number recognizing means is correct or incorrect and recognizing a reply to the confirmation from said caller, as well as conducting necessary processing according to the contents of the recognized reply;
   storage means for storing the phone number of said caller obtained by said caller's number recognizing means according to a result of the processing by said automatic answering means and stored in a data base; and
   automatic caller call-up means responsive to operator's instructions for reading the phone number of said caller stored in said storage means to call up said caller,
   wherein all calls arriving at said call receiving system are answered by said automatic answering means for a call back at a later time and each said call is disconnected and reconnected to said caller by said automatic caller call-up means before any said call is handled by a live operator of said arrived call receiving system.

2. The arrived call receiving system as set forth in claim 1, wherein
   said automatic answering means generating signals
   when a reply from said caller indicates that a phone number recognized by said caller's number recognizing means is correct, sends the phone number recognized by said caller's number recognizing means to said storage means, and
   when the reply from said caller indicates that the phone number recognized by said caller's number recognizing means is incorrect, demands input of a right phone number of said caller and upon recognizing the received phone number, again confirms by the caller whether the recognition result is correct.

3. The arrived call receiving system as set forth in claim 1, wherein
   said automatic answering means further comprising:
   automatic voice answering means for sending a predetermined message to give voice guidance to said caller,
   tone recognizing means for recognizing the contents of tone signals input by said caller, and
   voice recognizing means for recognizing the contents of voice response input by said caller.

4. The arrived call receiving system as set forth in claim 1, wherein
   said automatic answering means further comprising:
   automatic voice answering means for sending a predetermined message to give voice guidance to said caller,
   tone recognizing means for recognizing the contents of tone signals input by said caller, and
   voice recognizing means for recognizing the contents of voice response input by said caller, wherein
   said automatic answering means generating signals for
   when receiving the phone number of said caller from said caller's number recognizing means, to send a message to said caller for confirming whether said phone number is correct or incorrect,
   when in a recognition result obtained by said tone recognizing means or said voice recognizing means, a reply from said caller indicates that the phone number recognized by said caller's number recognizing means is correct, to send a message demanding that the caller should hang up once to wait for a receptionist to call back to perform reception services, and
   when a recognition result obtained by said tone recognizing means or said voice recognizing means, the replay from said caller indicates that the phone number recognized by said caller's number recognizing means is incorrect, to send a message to said caller demanding input of the correct phone number.

5. The arrived call receiving system as set forth in claim 1, further comprising
   line connecting means for connecting a line between said caller and an operator when said caller answers a call made by said caller automatic call-up means.

6. An arrived call receiving method which automatically answers a call and obtains necessary information to support reception services using a telephone, comprising the steps of:
   when a call arrives at said telephone, extracting and recognizing a phone number of a caller;
   confirming by said caller whether the phone number recognized by said caller's number recognizing step is correct and recognizing a reply to the confirmation from said caller, and processing according to the contents of the recognized reply;
   storing the phone number of said caller obtained by a caller's number recognizing step on a data base; and
   reading the phone number of said caller stored in said data base according to operator's instructions to automatically call up said caller, and
   automatically connecting a line between said caller and an operator when said caller answers a call made at an automatic call-up step;
   wherein all calls arriving at a call receiving system are answered by an extracting and recognizing step for a call back at a later time and each said call is disconnected and reconnected to said caller by said automatic caller call-up means before any said call is handled by a live operator of said arrived call receiving system.

7. The arrived call receiving method as set forth in claim 6, wherein
   said automatic answering step further comprising the steps of:
   when a reply from said caller indicates that a phone number recognized by said caller's number recognizing step is correct, sending the phone number recognized by said caller's number recognizing step for storing, and when the reply from said caller indicates that the phone number recognized by said caller's number recognizing step is incorrect, demanding input of a right phone number of said caller and upon recognizing the received phone number, again confirming by the caller whether the recognition result is correct.

8. The arrived call receiving method as set forth in claim 6, wherein said automatic answering step comprising the steps of:
when the phone number of said caller is received from said caller's number recognizing step, sending a voice message to said caller for confirming whether said phone number is correct or incorrect, when a reply from said caller indicates that the phone number recognized by said caller's number recognizing step is correct, sending a voice message demanding that the caller should hang up once to wait for a receptionist to call back to perform reception services, and sending the phone number recognized by said caller's number recognizing step for storing, and when the reply from said caller indicates that the phone number recognized by said caller's number recognizing step is incorrect, sending a voice message demanding input of the correct number of said caller and after recognizing the received phone number, again confirming by the caller whether the recognition result is correct or not.

9. A computer readable memory which stores a control program for controlling an arrived call receiving system which automatically answers a call and obtains necessary information to support reception services using a telephone, said control program comprising the steps of:

when a call arrives at said telephone, extracting and recognizing a phone number of a caller of the arrived call included in the arrived call;

confirming by said caller whether the phone number recognized by said caller's number recognizing step is correct and recognizing a reply to the confirmation from said caller, as well as conducting necessary processing according to the contents of a recognized reply;

storing in a data base the telephone number of said caller obtained by said caller's number recognizing step according to a result of the processing by said automatic answering step; and reading the phone number of said caller stored in said data base according to operator's instructions to automatically call up said caller;

wherein all calls arriving at said call receiving system being answered by said extracting and recognizing step for a call back at a later time and each said call is disconnected and reconnected to said caller by said automatic caller call-up means before any said call is handled by a live operator of said arrived call receiving system.

10. The computer readable memory as set forth in claim 9, wherein said control program of said automatic answering step further comprising the steps of:
when a reply from said caller indicates that a phone number recognized by said caller's number recognizing step is correct, sending the phone number recognized by said caller's number recognizing step for storing, and when the replay from said caller indicates that the phone number recognized by said caller's number recognizing step is incorrect, demanding input of a right phone number of said caller and upon recognizing the received phone number, again confirming by the caller whether the recognition result is correct.

11. The computer readable memory as set forth in claim 9, wherein said control program of said automatic answering step comprising the steps of:
when the phone number of said caller is received from said caller's number recognizing step, sending a voice message to said caller for confirming whether said phone number is correct or incorrect, when a reply from said caller indicates that the phone number recognized by said caller's number recognizing step is correct, sending a voice message demanding that the caller should hang up once to wait for a receptionist to call back to perform reception services, as well as storing the phone number recognized by said caller's number recognizing in said data base, and when the reply from said caller indicates that the phone number recognized by said caller's number recognizing step is incorrect, sending a voice message demanding input of a right number of said caller and after recognizing the received phone number, again confirming by the caller whether the recognition result is correct or not.

* * * * *

UNITED STATES PATENT AND TRADEMARK OFFICE
CERTIFICATE OF CORRECTION

PATENT NO. : 6,418,217 B1
DATED : July 9, 2002
INVENTOR(S) : Ukon, Shinichi

It is certified that error appears in the above-identified patent and that said Letters Patent is hereby corrected as shown below:

Column 10,
Line 26, "replay" should be -- reply --.

Column 12,
Line 20, "replay" should be -- reply --.

Signed and Sealed this

Eleventh Day of November, 2003

JAMES E. ROGAN
*Director of the United States Patent and Trademark Office*